United States Patent
Wahman

[11] 3,930,373
[45] Jan. 6, 1976

[54] REINFORCED CONCRETE PILE AND A METHOD OF MANUFACTURING SUCH A PILE

[75] Inventor: Lorentz Wahman, Goteborg, Sweden

[73] Assignee: Roy Asserback, Marbella, Spain

[22] Filed: Mar. 3, 1975

[21] Appl. No.: 554,704

Related U.S. Application Data

[62] Division of Ser. No. 471,899, May 21, 1974.

[30] Foreign Application Priority Data
May 21, 1973  Sweden .............................. 7307092

[52] U.S. Cl. .......................... 61/56; 61/53; 52/726; 403/316
[51] Int. Cl.² ........................ E02D 5/30; E04B 1/48
[58] Field of Search ........... 61/56, 56.5, 53; 52/726; 403/316, 319

[56] References Cited
UNITED STATES PATENTS
3,248,888  5/1966  Williams ................................. 61/56
3,382,680  5/1968  Takano .................................. 61/56

FOREIGN PATENTS OR APPLICATIONS
1,044,695  6/1953  France ................................... 61/56

*Primary Examiner*—Jacob Shapiro
*Attorney, Agent, or Firm*—Holman & Stern

[57] ABSTRACT

In a concrete pile the axially running bars of the reinforcing structure are attached to an end collar of the pile by threaded connectors screwed into the collar and each enclosing the threaded end of a reinforcing bar.

1 Claim, 10 Drawing Figures

REINFORCED CONCRETE PILE AND A METHOD OF MANUFACTURING SUCH A PILE

This is a divisional of application Ser. No. 471,899 filed May 21, 1974.

BACKGROUND OF THE INVENTION

The present invention refers to a reinforced concrete pile of the type having a collar or similar fitting at least at one of its ends, to which axially running reinforcing bars are attached. The invention also refers to a method of manufacturing such piles, as well as to the collar provided at the pile.

The collars fitted at one or both ends of a concrete pile, may be shaped as points, shoes or joint elements, and must be attached to the pile in such a manner that they can also take care of tensile strain loads in the pile. Hitherto the attaching of the collar has usually been made by means of anchor bolts, threaded into the collar and arranged parallel to the axial reinforcing bars in the pile. The anchor bolts usually have length of about one meter, and as many bolts as axial reinforcing bars are provided, fitted intermediate the ends thereof. Hereby a rather tight basket structure is obtained, which makes the introduction of the concrete compound at the ends of the pile difficult. When such a pile is subjected to tensile strain the axial forces cannot be transferred directly from the reinforcing bars to the collar, but must pass over to the anchor bolts by way of the concrete. This is not well suited for such action, so the actual transfer capacity is limited. Similarly the power strokes, when driving the pile, will largely have to be transferred from the anchor bolts to the reinforcing bars by way of the concrete.

It has been proposed to weld the axial reinforcing bars to the collar, but on the one end such welding will not provide the necessary strength, and on the other hand the collar is often made of nodular cast iron and the reinforcing bars of high class steel, so a welding will be generally difficult.

For a long time a desire to attach the reinforcing bars directly to the collar has been felt, but no simple, reliable solution has been found.

SUMMARY OF THE INVENTION

The aim of the present invention is to provide such a simple and reliable way of attaching the bars to the collar, and to propose a joint collar suitable for this purpose. The characterizing feature is that the collar is provided with threaded bores corresponding to the number of axial reinforcing bars within the pile, and that an externally threaded connector is fitted in each bore, said connector having an axial, internally threaded bore for the reception of the externally threaded end of a reinforcing bar as well as means for rotating the connector.

DESCRIPTION OF SOME PREFERRED EMBODIMENTS

Figure 1:
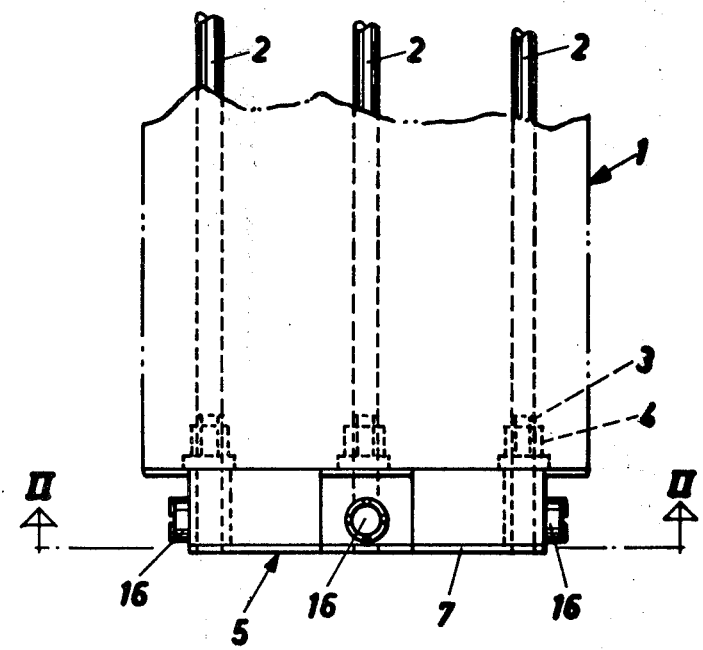
FIG. 1 shows an elevation of the end of a pile according to the invention, and provided with a collar forming part of a device for connecting two piles.
Figure 2:
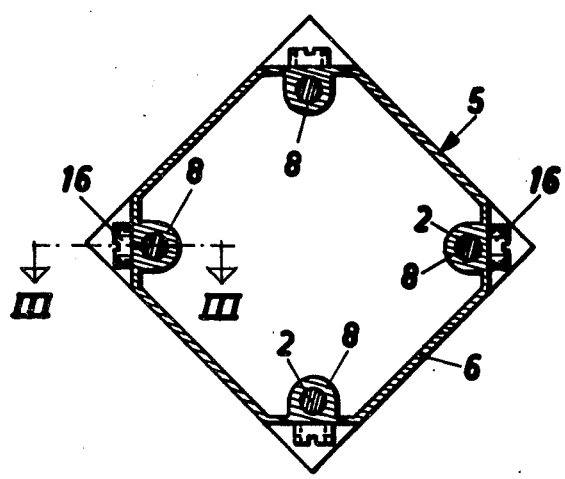
FIG. 2 is a section along line II—II in FIG. 1.
Figure 7:
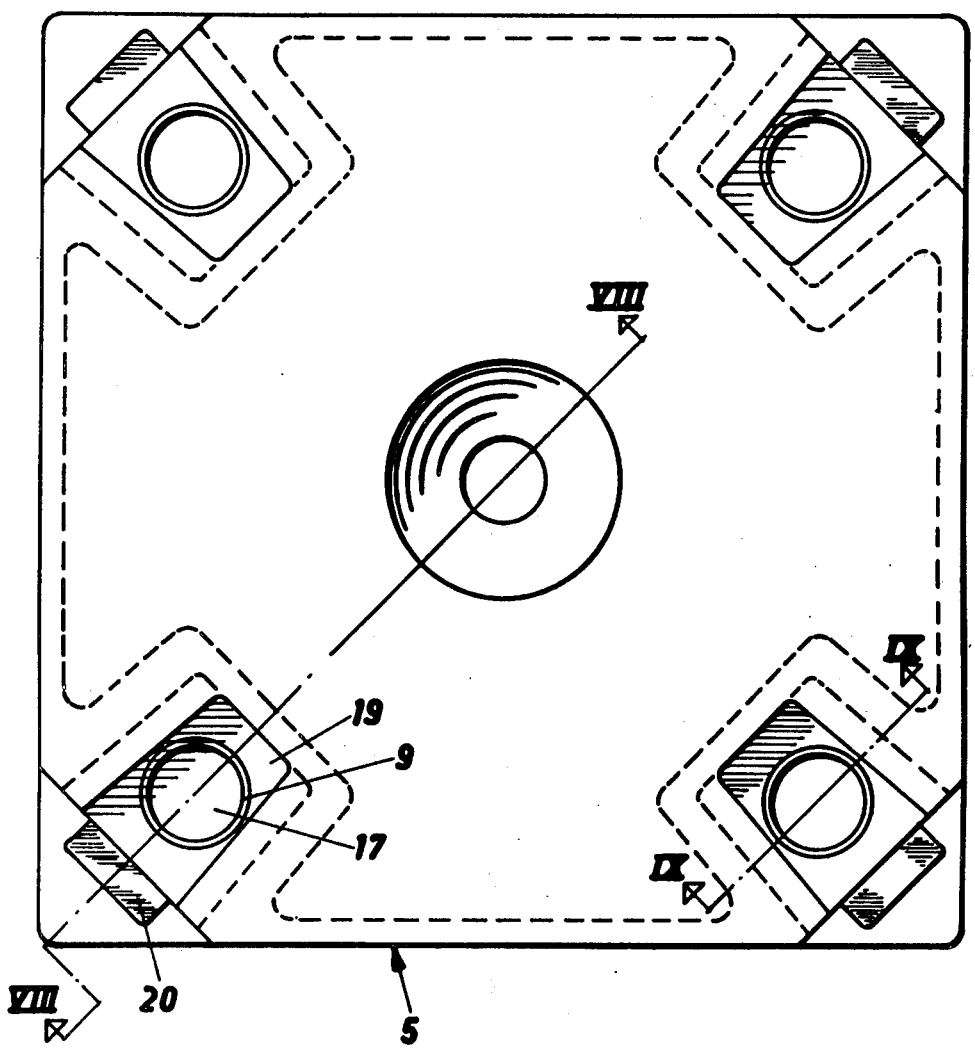
FIG. 7 shows, on a larger scale, an end view of the collar according to FIG. 6.
Figure 8:
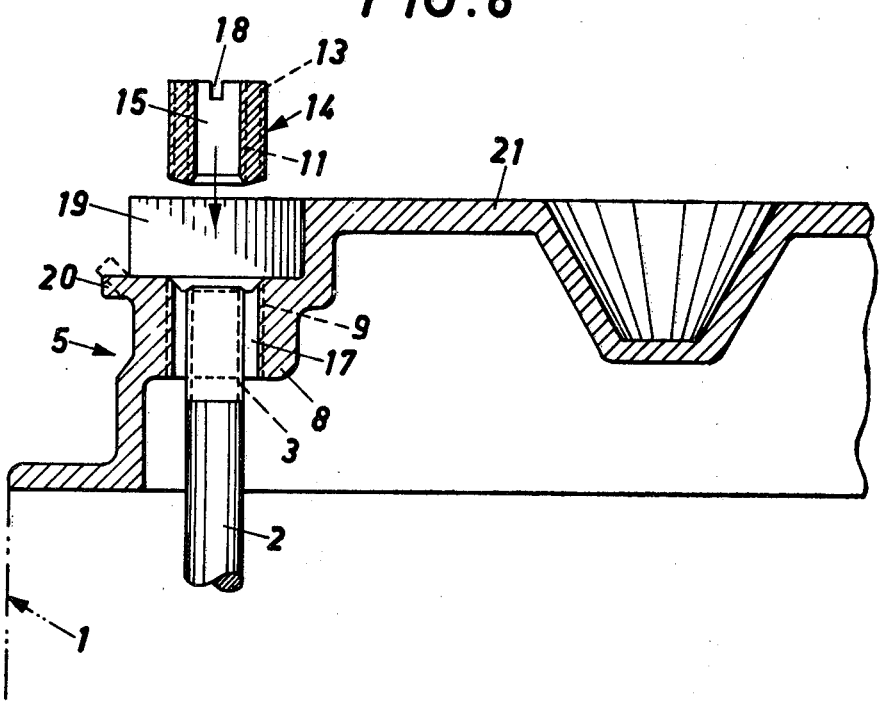
FIG. 8 is a section along line VIII—VIII in FIG. 7.

In FIG. 1 the end of a concrete pile is denoted by 1. This is provided with an internal reinforcing structure of which some axial bars are denoted by 2. The end of each bar is threaded at 3, mating with internal threads in a connector 4 adapted to be screwed into collar 5 forming the very end of the pile.

This collar is in FIG. 1 a part of a joint for connecting two piles, but may for other purposes be a pointed end portion or a shoe.

The collar includes an outer frame 6, having substantially the same shape as the cross section of the pile, and a bottom 7. At each corner of the frame a tubular member 8 is fitted, said member being provided with internal threads 9.

Figure 4:
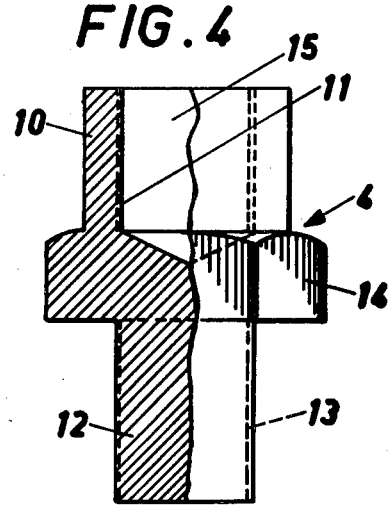
FIG. 4 shows a partly cut-up view of a connector.
Figure 5:
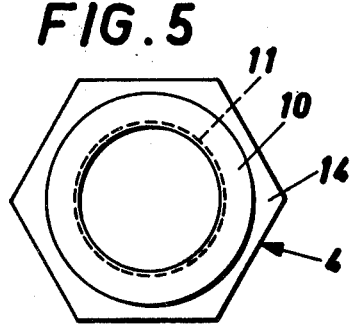
FIG. 5 shows the connector of FIG. 4 as viewed from above.

The connector 4 (FIGS. 4 and 5) includes a sleeve portion 10 having internal threads 11, and a spigot 12 having external threads 13. The spigot is separated from the sleeve by a noncircular intermediate part 14, which preferably has a square or hexagonal cross section to be gripped by a tool for turning the connector.

The threads 13 at the spigot mate with the threads 9 in the tubular member 8, and the threads 11 of the sleeve, which run in the opposite direction to those of the spigot, mate with the threads 3 at the reinforcing bars 2. Spigot 12 is preferably somewhat longer than the bore 15 of the sleeve 10, so it is possible initially to mount the connectors at the collar 5 by turning then a few times tubular members before the reinforcing bars are introduced into the sleeves. As the threads at the spigot and in the sleeve are running in opposite directions the bars 2 will be screwed into the sleeves while the connectors are screwed into the tubular members of the collar.

The collar is provided with externally accessible locking members 16 being cylindrical projection, one at each tubular member and directed perpendicularly with respect to the side face of the collar. When two piles are to be joined the collars are brought into engagement with their projections aligned. Any two adjacent, superimposed projections 16 are interconnected by means of a fish plate (not shown) having two bores, mating with the projections and separated a suitable distance. These fish plates are secured in any suitable manner to the projections after having been fitted thereon.

With the embodiment according to FIGS. 6–9 the threaded bores 17 in the collar have a larger diameter than that of the axial reinforcing bars 2. A tubular connector 4 is adapted to be fitted between the threaded ends 3 of a reinforcing bar and the bore 17. This is provided with internal threads 9 mating with the external threads 13 of the connector, the internal threads 11 of which mate with threads 3 at the bars 2. To facilitate the operation the connector is provided with a diametral slot 18 at one of its ends for the application of a screwdriver or some similar tool. The opposite end of the connector is chamfered, internally as well as externally. The mouth of the bore 17 is correspondingly chamfered.

Figure 6:
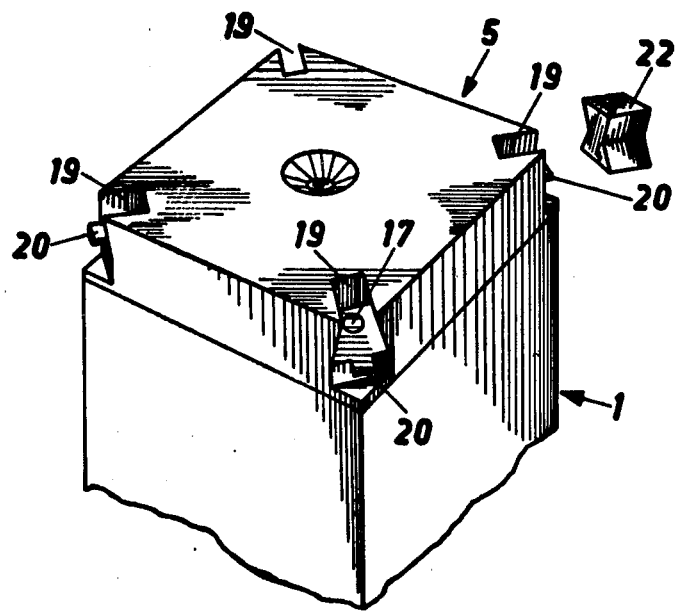
FIG. 6 shows a perspective view of the end of a pile of a somewhat modified shape.
Figure 9:
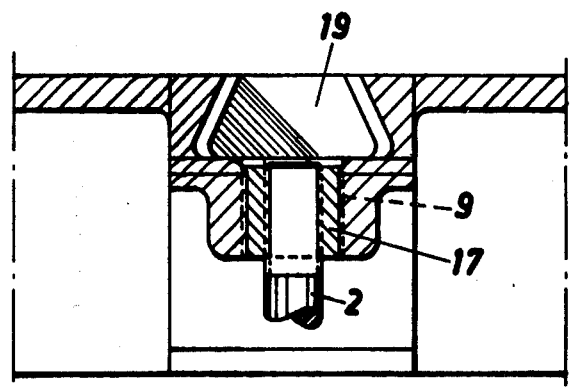
FIG. 9 is a section along line IX—IX in FIG. 7.
Figure 3:
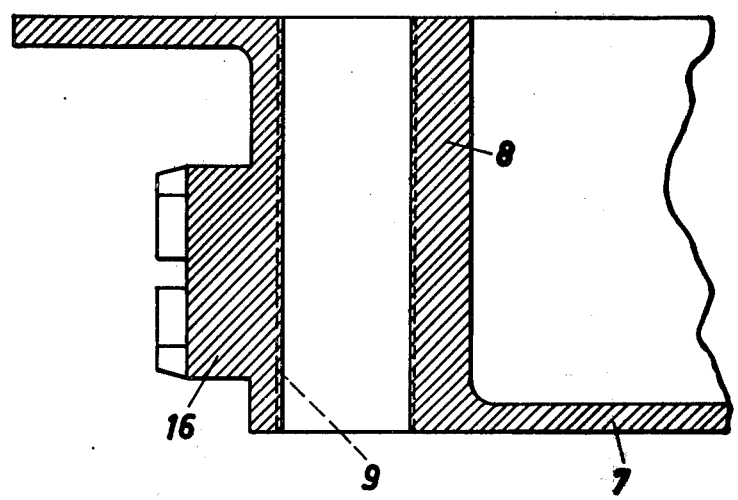
FIG. 3 shows, on a larger scale, a section along line III—III of FIG. 2.

Each bore 17 is in the collar shown in FIGS. 6 and 9 as located at the bottom of a dove-tailed groove 19. One such groove is arranged at each corner of the collar and is directed diagonally inwards. At least one lip 20 is provided at the entrance to each groove 19, protruding from the bottom and/or from any of the side walls thereof. By bending or other deformation this lip may be used to lock a wedge 21 introduced into the groove. This wedge has a twin dove-tailed cross section and is intended to interconnect two adjacent collars 5. The wedges will strengthen the structure and the forces transferred by way of bars 2 will be better distributed in the structure than if the connectors had been located intermediate the grooves.

Figure 10:
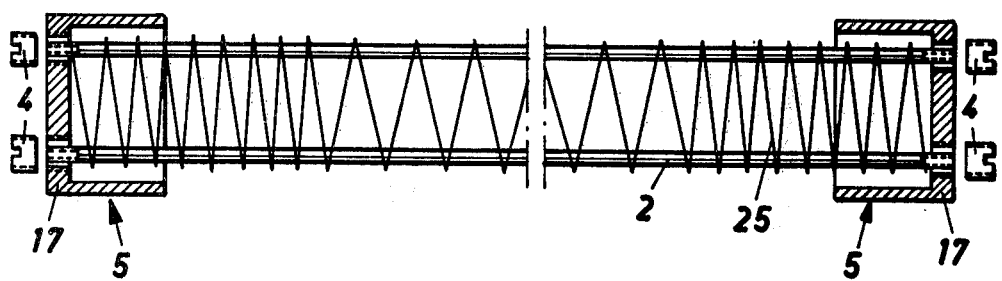
FIG. 10 shows a step during the manufacture of a pile having a collar at each end.

The manufacture of a pile is brought about in the following general manner. The axial reinforcing bars are cut to lengths suited to the pile. If this is to have a collar at both ends, both ends of the bars are externally threaded as is shown in FIG. 10. A transverse, secondary reinforcement 25 is mounted upon bars 2 and attached thereto, the bars being fitted in a suitable fixture (not shown). The collars 5 are then located over the bars so the threaded ends thereof extend about to, but not past the bottoms of the pertaining grooves 19. The connectors 4 are then screwed into the bores 17 and will bring about a very efficient joint between the bars and collar, which hereby will be able to take care of high loads. Finally the reinforcing structure is placed in a mould which is filled with the concrete compound.

What I claim is:

1. A method of manufacturing reinforced concrete piles, each pile at least at one of its ends being provided with a collar, in which longitudinally running reinforcing bars are cut to exact lengths and are threaded at least at one of their ends, a collar provided with threaded bores corresponding in number to the desired number of axial reinforcing bars and having a bigger diameter than said bars is fitted to at least one end of the bars, an externally threaded connector having an internally threaded bore is fitted in each bore in the collar to attach the reinforcing bars thereto, and the reinforcing unit thus produced is placed in a mould which thereafter is filled with concrete.

* * * * *